Nov. 23, 1965 T. F. PETERS 3,219,387
RETRACTABLE SEAT BELT
Filed Sept. 5, 1963
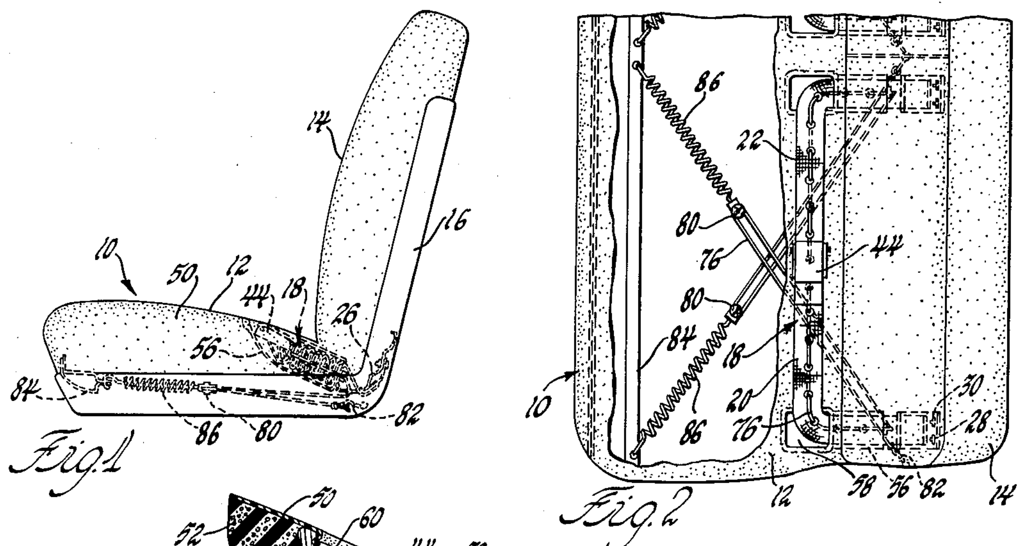
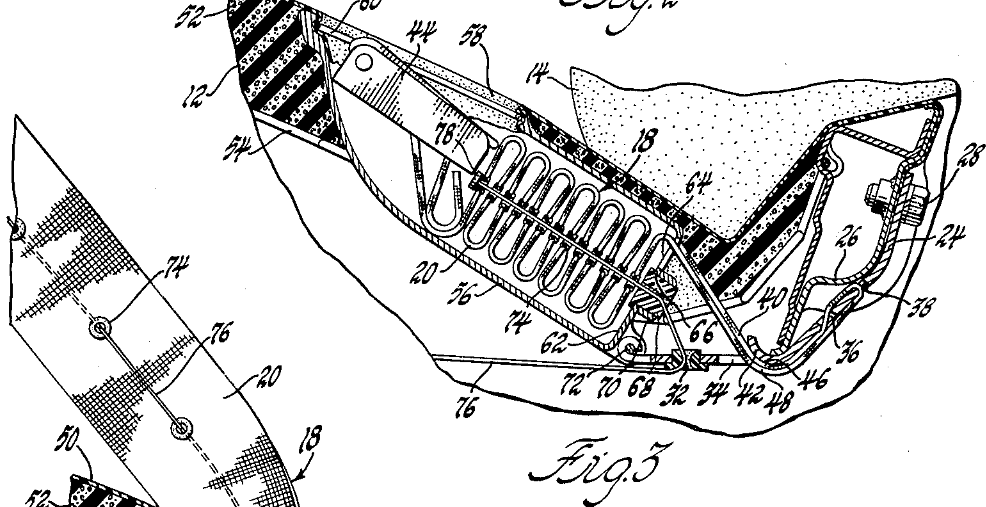
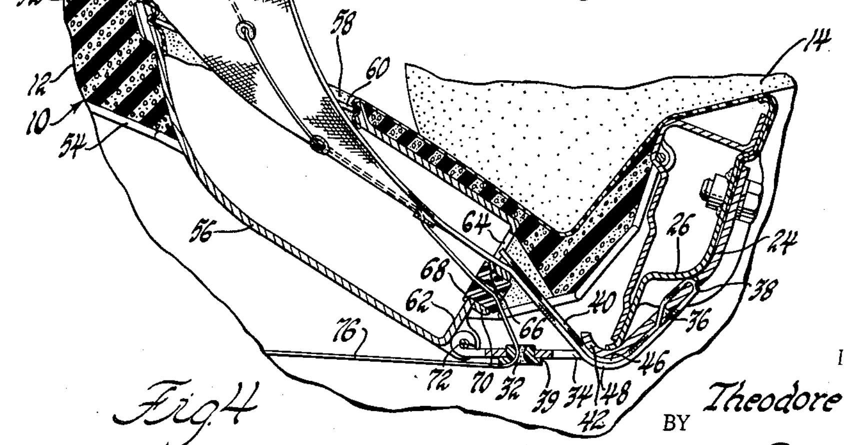
INVENTOR.
BY Theodore F. Peters
Paul J. Ethington
ATTORNEY United States Patent Office 3,219,387

Patented Nov. 23, 1965

3,219,387

RETRACTABLE SEAT BELT

Theodore F. Peters, Utica, Mich., assignor to General Motors Corporation, Detroit, Mich., a corporation of Delaware Filed Sept. 5, 1963, Ser. No. 306,910

3 Claims. (Cl. 297—388)

This invention relates to safety devices for use in vehicles such as automobiles or airplanes for preventing passengers from being thrown forward upon the rapid deceleration of the vehicle. More particularly, this invention relates to retractable seat belts.

The injuries suffered by passengers in vehicle collisions are frequently due to the fact that the inertia of the passenger in the rapidly moving vehicle causes the passenger to be thrown forward suddenly when the vehicle is rapidly decelerated. Thus, in a collision the driver of the vehicle may be projected violently against the steering wheel and windshield of the car and may be seriously or even fatally injured.

Since the advent of aircraft seat belts, numerous types of seat belt assemblies have been proposed as a substantial aid in diminishing the number of automobile fatalities. The seat belts are usually secured to the seat or floor structure of the vehicle and pass around the body of the passenger so as to restrain forward movement from the seat. While the seat belt is generally accepted as being of substantial assistance in injury reduction, still no universal acceptance of automobile seat belt assemblies has been forthcoming. This is due in part because the belts are unsightly and when not in use, the loose ends are normally found disarranged on the seat or dangling toward the floor. Sometimes the passengers sit down on the belts which then become entangled with their clothing and it is somewhat of a struggle for most passengers to find the two halves of the buckle and to fasten themselves in place.

The disadvantages associated with the conventional seat belt assemblies are obviated by the present invention wherein each of the seat belt sections are retracted into a housing mounted in the seat. When thus retracted, the seat belts and buckles are unlikely to come into contact with the occupant of the seat when the belts are not in use and yet are readily accessible for use when desired.

In accordance with the present invention, each of the seat belt sections has one end secured to the vehicle while the other end is provided with buckle means for fastening the two sections about the user. Each of the belt sections is provided with a plurality of spaced openings therein through which is threaded a flexible cable. A seat belt housing mounted in the seat cushion is located intermediate the ends of the belt sections and has openings at opposite ends for accommodating passage of the belt sections. An additional opening is provided at one end of the housing for accommodating passage of the flexible cable. The cable is secured at one end to the vehicle floor structure and is provided with stop means on the other end to prevent withdrawal of the cable through the openings in the belt sections. Spring means are provided for exerting a force on the cable intermediate its ends so that the belt normally tends to be drawn up in accordion-like fashion into the housing means.

There is thus provided a seat belt retracting mechanism which is effective to retract the seat belt into a housing within the seat cushion when not in use yet which in no way interferes with the effectiveness of the seat belt during its normal use.

A more complete understanding of the invention and the associated advantages thereof may be derived from a reading of the following detailed description taken with the drawings in which:

FIGURE 1 is a side elevation view of the front seat of an automobile showing the seat belt in a retracted position;

FIGURE 2 is a top plan view with parts broken away;

FIGURE 3 is a sectional view showing the seat belt fully retracted;

FIGURE 4 is a sectional view showing the seat belt in an extended position.

Referring to the drawings and initially to FIGURE 1, there is shown a preferred embodiment of the invention in which a motor vehicle seat generally designated 10 having a seat cushion 12 and a seat back 14 is mounted in a seat support 16. It will be understood that the seat 10 may be of any conventional construction and may be supported in any suitable fashion customary in the construction of automobile vehicles. For example, the seat support 16 is of one piece construction but the invention may be utilized successfully in a seat having a divided seat support. Additionally, it is customary to mount the front seat in tray-like structures which are movable vertically and horizontally for adjusting the seat to suit the comfort of the occupant. No such mechanism is shown herein, it being understood that the present invention may be adapted to any such structure or arrangement.

The invention will be described with regards to the safety belt associated with the driver's side of the seat, it being understood that the invention is also applicable with regards to the passenger's side of the seat.

Referring now to FIGURES 2 and 3, the seat 10 is provided with a safety belt 18 formed of webbing, leather, or other suitable material and comprising a pair of belt sections 20 and 22. An anchoring bracket 24 is attached to the seat frame 26 by suitable means such as a nut and bolt assemblies 28 and 30 and is provided with a plurality of openings or slots 32, 34, 36, and 38. The opening 32 is provided with a bushing 39 for a purpose which will become apparent hereinafter. The end 40 of each seat belt section 20 and 22 is secured to the bracket 24 by passing the end 40 down through the opening 34, up through the slot 38, down through the slot 36 and back up through the opening 34. The edge 42 of the opening 34 is upturned to prevent excessive wear of the belt due to engagement with this edge of the opening. A buckle 44 is attached to the free end of the section 20 and a metal locking plate, not shown, is attached to the free end of the section 22. The buckle may be of any conventional design and requires no further explanation since this specific structure employed is not important to the practice of this invention. It will be readily apparent that when the belt has been installed as described and has been placed in use by fastening the free ends thereof around the occupant any force tending to move the occupant forward or upward out of the seat will be resisted by the belt. By passing the belt end 40 through the openings 34, 36, and 38 in the bracket 24, as hereinbefore described, a portion 46 of the belt sections 20 and 22 will be wedged between the upturned edge 42 and a portion 48 of the sections 20 and 22 thus preventing any slippage when tension is applied to the belt.

The inner construction of the seat cushion 12 is shown in FIGURES 3 and 4. An outer fabric cover 50 is placed above a layer of foam rubber or other resilient material 52 which is supported by springs 54 arranged in a pattern which is conventional in automobile seat cushions.

A seat belt housing 56 composed of plastic or other suitable material is associated with each of the seat belt sections 20 and 22 and is mounted in the seat cushion 12 and has an opening 58 in the upper end thereof. A snap ring 60 is provided for locking the fabric 50 surrounding the opening 58 in place. The lower or rear portion 62 of the housing 56 is provided with upper and lower openings 64 and 66. The upper opening 64 provides a passageway for connection of the end 40 of the seat belt section 20 with the bracket 24 as hereinbefore described. The lower opening 66 is provided with a bushing 34, up through the slot 38, down through the slot nut 70. The housing 56 is pivotally mounted at 72 to the bracket 24 so that the housing 56 is free to move in a vertical direction during flexing of the seat cushion 12 during occupancy of the seat 10.

The seat belt sections 20 and 22 are provided with spaced eyelets or grommets 74. Belt gathering means such as a flexible wire 76 extends through the grommets 74 and is provided with suitable stop means 78 at one end thereof. The wire 76 passes through the bushings 68 and 39, around a pulley 80, and is attached at the other end thereof to a hook 82 which is secured to the seat support 16. A bracket 84 is suitably attached to the seat support 16 or any stationary part of the vehicle, suitably spaced from the back of the seat. A spring 86 has one end secured to the pulley 80 while the other end is provided with a hook which may be readily attached to the bracket 84.

The operation of the device is simple. When not in use, the seat belt sections 20 and 22 will be retracted into the housing 56 in accordian-like fashion due to the force exerted by the spring 86 on the wire 76 intermediate the ends of the wire. To place the seat belt in use, the user occupying the seat merely grasps the two belt sections 20 and 22 and withdraws them from the housing 56, as shown in FIGURES 2 and 4 and buckles or joins the free ends thereof.

It will be understood that for maximum protection of the user of the belt, the belt should extend when in use, with no slack between the free and anchored ends thereof.

From the above description, it is evident that a seat belt retractor is provided which will retract the belt in accordian-like fashion when not in use into a relatively small housing which is situated within the seat. In this manner the belt is readily accessible but the housing does not present an obstruction to the vehicle passengers and does not interfere with the mechanical mounting or adjustment of the seat.

Although the description of this invention has been given with respect to a particular embodiment, it is not to be construed in a limiting sense. Many variations and modifications within the spirit and the scope of the invention will now occur to those skilled in the art. For a definition of the invention, reference is made to the appended claims.

I claim:

1. A retractable seat belt assembly for use in a motor vehicle having a floor structure and a seat mounted on said floor, said assembly comprising seat belt housing means mounted in said seat, a seat belt section passing through said housing and having one end secured to said seat, said seat belt section having spaced openings therein, gathering means passing tnrough said housing and threaded through said openings and having one end secured to said floor and including stop means for preventing withdrawal of the other end through said openings, spring means exerting a force on said gathering means substantially intermediate the ends thereof whereby said seat belt portion is retracted into said housing means when not in use.

2. A retractable seat belt assembly for use in a motor vehicle having a floor structure and a seat mounted on said floor, said assembly comprising a seat belt canister mounted in said seat and having a first and second opening therein, a seat belt section having a plurality of spaced eyelets therein, said seat belt section passing through said first opening and having one end secured to said seat and the other end secured to buckle means, a flexible strand of material passing through said second opening in said housing and having one end attached to said floor and being threaded through said eyelets, said strand of material including stop means at the other end thereof for preventing withdrawal of said strand of material through said eyelets, a spring attached at one end to said seat, a pulley attached to the other end of said spring, said strand passing around said pulley, said spring exerting a force on said pulley whereby said belt is retracted into said housing when not in use.

3. In a motor vehicle having a floor structure and a seat mounted on said floor, said seat comprising a seat cushion and a seat back, a seat belt assembly comprising a pair of belt sections, buckle means carried on one end of one of said belt sections and receiving one end of the other belt section, the other ends of said belt sections being secured to said seat, first and second seat belt housings mounted in said seat cushion and having openings at each end thereof for passage of said seat belt sections, said belt sections having spaced eyelets therein, a first and second flexible wire passing through one end of said first and second housings respectively and threaded through said eyelets, one end of each of said wires being secured to said floor, the other end of each of said wires including stop means for preventing withdrawal of said wires from said eyelets under normal operating conditions, first and second spring means exerting a force intermediate the ends of said first and second wires respectively to retract said belt sections into said housings in accordian-like fashion when said belt sections are not in use.

References Cited by the Examiner

UNITED STATES PATENTS

| | | | |
|---|---|---|---|
| 1,211,696 | 1/1917 | Geiger | 160—84 X |
| 1,789,724 | 1/1931 | Carver | 160—84 |
| 2,260,101 | 10/1941 | De Falco | 160—84 |
| 2,263,348 | 11/1941 | Barros | 297—386 |
| 2,725,097 | 11/1955 | Thoreson | 297—388 |
| 2,771,127 | 11/1956 | Cole | 297—188 X |
| 2,830,655 | 4/1958 | Lalande | 297—388 |
| 2,964,100 | 12/1960 | McCall | 297—388 |
| 3,117,818 | 1/1964 | Fredericks | 297—388 |
| 3,137,526 | 6/1964 | Carreberg | 297—388 |

FRANK B. SHERRY, *Primary Examiner.*

CHANCELLOR E. HARRIS, *Examiner.*

UNITED STATES PATENT OFFICE
CERTIFICATE OF CORRECTION

Patent No. 3,219,387 November 23, 1965

Theodore F. Peters

It is hereby certified that error appears in the above numbered patent requiring correction and that the said Letters Patent should read as corrected below.

Column 3, lines 4 and 5, for "34, up through the slot 38, down through the slot nut 70." read -- 68 which is securedly held in placed by means of a jam-nut 70. --.

Signed and sealed this 20th day of September 1966.

(SEAL)
Attest:

ERNEST W. SWIDER
Attesting Officer

EDWARD J. BRENNER
Commissioner of Patents